United States Patent [19]
Kobayashi

[11] Patent Number: 6,031,253
[45] Date of Patent: Feb. 29, 2000

[54] PACKAGE FOR HOUSING PHOTOSEMICONDUCTOR DEVICE

[75] Inventor: Minoru Kobayashi, Shiga, Japan

[73] Assignee: Kyocera Corporation, Tokyo, Japan

[21] Appl. No.: 09/163,080

[22] Filed: Sep. 29, 1998

[30] Foreign Application Priority Data

Sep. 30, 1997 [JP] Japan .................................. 9-266377
Dec. 24, 1997 [JP] Japan .................................. 9-355850

[51] Int. Cl.⁷ ........................ H01L 33/00; H01L 31/0232
[52] U.S. Cl. .......................... 257/99; 257/98; 257/432; 257/433
[58] Field of Search .............................. 257/98, 99, 432, 257/433

[56] References Cited

U.S. PATENT DOCUMENTS

| 3,816,847 | 6/1974 | Nagao | 257/98 |
| 4,307,934 | 12/1981 | Palmer | 257/433 |
| 5,132,532 | 7/1992 | Watanabe | 250/239 |
| 5,744,848 | 4/1998 | Harazono | 257/433 |

FOREIGN PATENT DOCUMENTS 2501547  4/1996  Japan .

*Primary Examiner*—Teresa M. Arroyo
*Attorney, Agent, or Firm*—Loeb & Loeb LLP

[57] ABSTRACT

A package for housing a photosemiconductor device includes: a substrate having a mounting portion for mounting a photosemiconductor device thereon; a frame attached onto the substrate so as to surround the mounting portion and having a through hole in a side portion thereof; a metallic fixing member fixed in the through hole and in which an optical fiber is to be fixed at the outer end and a cylindrical lens is fixed at the inner end; and a lid to be attached to the top surface of the frame and hermetically sealing the photosemiconductor device. Only the central region of the circumferential surface of the cylindrical lens is brazed to the inner surface of the metallic fixing member with a brazing filler metal. Consequently, outer region of the circumferential surface of the cylindrical lens near the ends thereof is not brazed, so that no stress concentrates on the cylindrical lens. As a result, the cylindrical lens is resistant to cracking. In addition to this structure, the metallic fixing member is fixed to keep a gap from the through hole. Consequently, the thermal stress of the frame does not reach the portion of the metallic fixing member where the cylindrical lens is fixed. As a result, the cylindrical lens is more resistant to cracking.

7 Claims, 3 Drawing Sheets

PACKAGE FOR HOUSING PHOTOSEMICONDUCTOR DEVICE

BACKGROUND OF THE INVENTION

1. Field of the Invention

The present invention relates to a package for housing a photosemiconductor device, and more particularly, to a package for housing a photosemiconductor device having an improved lens member fixing structure.

2. Description of the Related Art

A typical conventional package for housing a photosemiconductor device comprises, as illustrated in the cross-sectional view of FIG. 5, a substrate 21 made of a metal such as an iron-nickel-cobalt or copper-tungsten alloy, having a mounting portion 21a on which the photosemiconductor device 24 is to be mounted via a Peltier device 25, on the center of a top side of the substrate 21, the substrate having a plurality of external lead terminals 26 which are fixed around the mounting portion 21a to penetrate the substrate 21 from the top side to the bottom side thereof via an insulator 27; a frame 22 made of a metal such as an iron-nickel-cobalt alloy, which frame 22 is attached onto the substrate 21 so as to surround the mounting portion 21a, and has a through hole 22a in a side portion thereof; a cylindrical metallic fixing member 29 made of a metal such as an iron-nickel-cobalt alloy, which is fixed in the through hole 22a of the frame 22 so that an inner end portion protrudes inside the frame 22, and in an outer end portion of which an optical fiber 30 for optical signal exchange between the photosemiconductor device 24 and an external device is to be fixedly inserted, a cylindrical lens 31 fixed in the inner end portion of the metallic fixing member 29 and hermetically separating the inside and outside of the frame 22; and a lid 23 to be bonded to the top surface of the frame 22 and hermetically sealing the photosemiconductor device 24. To obtain a photosemiconductor apparatus as a product, the photosemiconductor device 24 is bonded onto the mounting portion 21a of the substrate 21, the electrodes of the photosemiconductor device 24 are electrically connected to the external lead terminals 26 via bonding wires 28, the lid 23 is bonded to the top surface of the frame 22 so that the photosemiconductor device 24 is hermetically housed in a package mainly comprising the substrate 21, the frame 22 and the lid 23, and the optical fiber 30 is inserted and fixed in the metallic fixing member 29.

Such a photosemiconductor apparatus functions as a photosemiconductor apparatus used for high-speed optical communications in such a manner that the photosemiconductor device 24 excites light in response to a drive signal supplied from an external electric circuit, and the excited light is received by the optical fiber 30 through the cylindrical lens 31 and is transmitted through the optical fiber 30.

The cylindrical lens 31 is made of a glass material which has a lens function achieved by making changes in refractive index from the central axis to the circumferencial portion thereof. To fix the cylindrical lens 31 to the metallic fixing member 29, a metal thin film of, for example, Ti.Pt.Au is applied onto the entire circumferential surface of the cylindrical lens 31, the cylindrical lens 31 with the metal thin film applied thereto is inserted into the metallic fixing member 29, and the metal thin film applied onto the circumferential surface of the cylindrical lens 31 and the inner surface of the metallic fixing member 29 are brazed with a brazing filler metal of a gold-tin or gold-copper alloy.

However, in the package for housing a photosemiconductor device, since the thermal expansion coefficient of the iron-nickel-cobalt alloy of which the metallic fixing member 29 is made (approximately $6 \times 10^{-6}/°C$.) largely differs from the thermal expansion coefficient of the glass of which the cylindrical lens 31 is made (approximately $10 \times 10^{-6}/°C$.) and the entire circumferential surface of the cylindrical lens 31 is brazed, large thermal stress is caused between the cylindrical lens 31 and the metallic fixing member 29 because of the thermal expansion coefficient difference therebetween when the circumferential surface of the cylindrical lens 31 is brazed to the inner surface of the metallic fixing member 29 with a brazing filler metal such as a gold-tin alloy, and the thermal stress directly acts on the edges between the circumferential surface and the end surface of the cylindrical lens 31. Consequently, since stress is apt to concentrate on edges, the stress largely concentrates on the edges and stays therein. When heat generated during operation of the photosemiconductor device 24 is repetitively applied thereto, the thermal stress causes in the cylindrical lens 31 cracks starting at the edges between the circumferential surface and the end surface of the cylindrical lens 31 in synergy with the stress staying in the edges. Consequently, when the light excited by the photosemiconductor device 24 is transmitted to the optical fiber 30 through the cylindrical lens 31, irregular reflection occurs at the cylindrical lens 31, so that the light excited by the photosemiconductor device 24 cannot be excellently received by the optical fiber 30 through the cylindrical lens 31, or the hermeticity of the package is broken by the cracks caused in the cylindrical lens 31. As a result, the photosemiconductor device 24 housed in the package cannot be normally and stably operated for a long period of time.

SUMMARY OF THE INVENTION

The invention is made in view of such a situation, and an object thereof is to provide a package for housing a photosemiconductor device in which even if heat generated during operation of the photosemiconductor device housed in the package is repetitively applied, no cracks are generated in the cylindrical lens, the light excited by the photosemiconductor device can be excellently received by the optical fiber through the cylindrical lens, and the photosemiconductor device housed in the package can be normally and stably operated for a long period of time.

The invention provides a package for housing a photosemiconductor device comprising a substrate having a mounting portion on a top surface of which a photosemiconductor device is to be mounted; a frame attached onto the top surface of the substrate so as to surround the mounting portion, having a through hole in a side portion thereof; a cylindrical metallic fixing member fixed in the through hole, in which an optical fiber is to be fixed at an outside end of the frame and a cylindrical lens is fixed at an inside end of the frame; and a lid to be attached to the top surface of the frame, which lid hermetically seals the photosemiconductor device, wherein the cylindrical lens is fixed to a portion of the inner surface of the metallic fixing member with a brazing filler metal in only a central region of the circumferential surface of the cylindrical lens.

According to the package for housing a photosemiconductor device of the invention, since the cylindrical lens is fixed to a portion of the inner circumferential surface of the metallic fixing member with a brazing filler metal in only a central region of the circumferential surface of the cylindrical lens and outer regions of the circumferential surface of the cylindrical lens near the ends thereof are not brazed, the thermal stress generated when the cylindrical lens is brazed to the metallic fixing member does not directly act on the edges between the circumferential surface and end surfaces of the cylindrical lens, so that it never occurs that the stress caused in brazing largely concentrates on the edges and remains therein.

Moreover, in the invention it is preferable that the metallic fixing member has a ring-shaped protrusion having a width shorter than the length of the cylindrical lens on the inner circumferential surface thereof, and the cylindrical lens is fixed to an inner circumferential surface of the ring-shaped protrusion.

According to the invention, the metallic fixing member has the ring-shaped protrusion having a width shorter than the length of the cylindrical lens on the inner circumferential surface thereof, and the central region of the circumferential surface of the cylindrical lens is brazed to the ring-shaped protrusion, so that it is facilitated to fix the cylindrical lens without brazing the outer regions of the circumferential surface of the cylindrical lens near the ends thereof.

Moreover, in the invention it is preferable that ends of the cylindrical lens fixed to the ring-shaped protrusion extend from the ring-shaped protrusion by 0.3 mm or more.

When the amount by which the ends of the cylindrical lens extend from the ring-shaped protrusion of the metallic fixing member is less than 0.3 mm, the puddle of brazing filler metal tends to reach the edges between the end surface and circumferential surface of the cylindrical lens when the cylindrical lens is brazed to the metallic fixing member, so that the brazing stress directly acts on the edges and remains therein. This stress tends to cause cracks in the cylindrical lens in synergy with the thermal stress due to the heat generated during operation of the photosemiconductor device. Therefore, the cylindrical lens is fixed so that its ends extend from the ring-shaped protrusion of the metallic fixing member by 0.3 mm or more.

Moreover, in the invention it is preferable that the metallic fixing member is fixed so that there is a gap between the metallic fixing member and the inner surface of the through hole of the frame in which the metallic fixing member is inserted.

Since the metallic fixing member according to the invention is fixed to the frame to keep a gap from the inner surface of the through hole, even if the metallic fixing member, the frame and the cylindrical lens thermally expand or contract due to the heat generated during operation of the photosemiconductor device, the stress due to the thermal expansion or the thermal contraction of the frame is never applied to the portion of the metallic fixing member where the cylindrical lens is fixed, so that the stress is never applied to the cylindrical lens.

Moreover, in the invention it is preferable that the gap between the metallic fixing member and the inner surface of the through hole in which the metallic fixing member is inserted is 0.05 to 0.5 mm. When the gap is less than 0.05 mm, there is a possibility that in brazing the metallic fixing member to the frame, part of the brazing filler metal enters the gap because of a capillary phenomenon to fill the gap. When the gap exceeds 0.5 mm, a junction member such as a ring-shaped metal fitting mentioned later, or the metallic fixing member integrated therewith is unnecessarily upsized, causing difficulties in downsizing of the package.

Moreover, in the invention it is preferable that the metallic fixing member has a ring-shaped protrusion having a width shorter than the length of the cylindrical lens on the inner circumferential surface thereof and the cylindrical lens is fixed to the inner surface of the ring-shaped protrusion.

According to the invention, the metallic fixing member has the ring-shaped protrusion having a width shorter than the length of the cylindrical lens on the inner circumferential surface thereof, and the central region of the circumferential surface of the cylindrical lens is brazed to the ring-shaped protrusion, so that it is facilitated to fix the cylindrical length without brazing outer regions of the circumferential surface of the cylindrical lens near the ends thereof.

Moreover, in the invention it is preferable that ends of the cylindrical lens fixed to the ring-shaped protrusion extend from the ring-shaped protrusion by 0.3 mm or more.

When the amount by which the ends of the cylindrical lens extend from the ring-shaped protrusion of the metallic fixing member is less than 0.3 mm, a puddle of the brazing filler metal tends to reach the edges between the end surface and circumferential surface of the cylindrical lens when brazing the cylindrical lens to the metallic fixing member, so that the brazing stress directly acts on the edges and remains therein. This stress tends to cause cracks in the cylindrical lens in synergy with the thermal stress due to the heat generated during operation of the photosemiconductor device. Therefore, the cylindrical lens is fixed so that its ends extend from the ring-shaped protrusion of the metallic fixing member by 0.3 mm or more.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
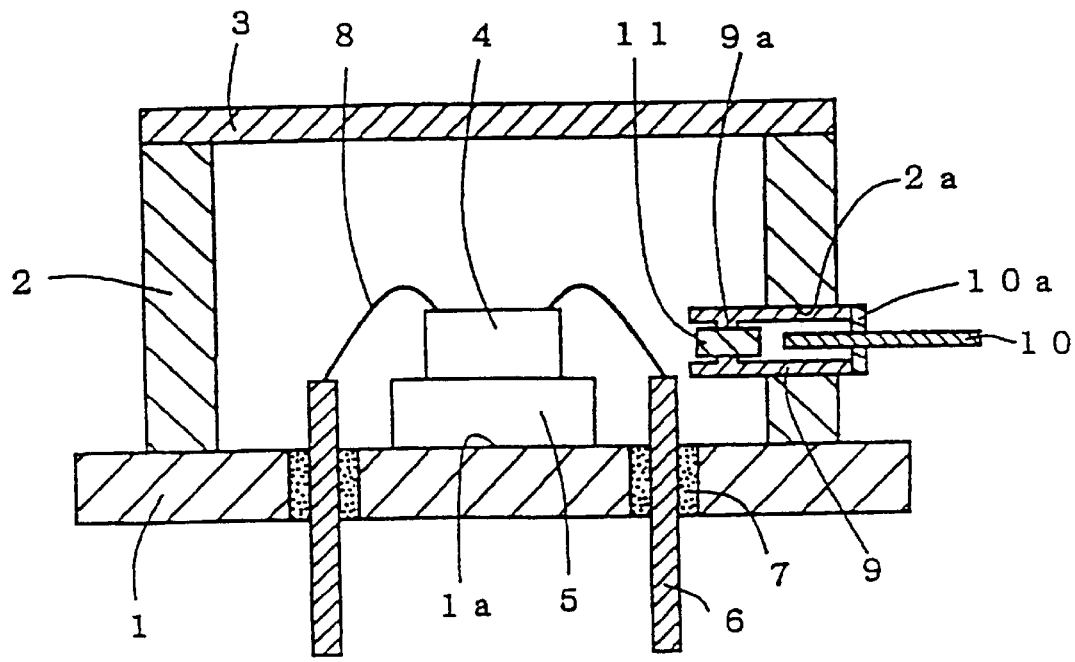
FIG. 1 is a cross-sectional view of an embodiment of a package for housing a photosemiconductor device according to the invention.

Now referring to the drawings, preferred embodiments of the invention are described below.

FIG. 1 is a cross-sectional view of an embodiment of a package for housing a photosemiconductor device according to the invention. The package for housing a photosemiconductor device 4 comprises a substrate 1, a frame 2 and a lid 3.

The substrate 1 functions as a support member for supporting the photosemiconductor device 4, and has substantially on the center of its top surface a mounting portion 1a for mounting the photosemiconductor device 4 thereon. Onto the mounting portion 1a, the photosemiconductor device 4 is bonded with a Peltier device 5 in between via a bonding agent such as a brazing filler metal of gold and silicon.

The substrate 1 is made of a metal material such as an iron-nickel-cobalt or copper-tungsten alloy. For example, in the case where the substrate 1 is made of the iron-nickel-cobalt alloy, the substrate 1 is formed by performing a known metalworking process such as rolling or punching on an ingot of the iron-nickel-cobalt alloy.

By coating the outer surface of the substrate 1 successively with metal layers excellent in corrosion resistance and wettability with the brazing filler metal, specifically, a nickel layer having a thickness of 2 to 6 μm and a gold layer having a thickness of 0.5 to 5 μm by plating, the substrate 1 can be effectively prevented from being subject to oxidative corrosion and the Peltier device 5 disposed below the photosemiconductor device 4 can be firmly bonded onto the top surface of the substrate 1. Therefore, it is desirable to coat the outer surface of the substrate 1 successively with a nickel layer having a thickness of 2 to 6 μm and a gold layer having a thickness of 0.5 to 5 μm by plating.

In the substrate 1, a plurality of external lead terminals 6 penetrating the substrate 1 are fixed with insulators 7 such as glass in between so as to surround the mounting portion 1a on which the photosemiconductor device 4 is mounted.

The external lead terminals 6 electrically connect the electrodes of the photosemiconductor device 4 to an external electric circuit, and have one ends thereof connected to the electrodes of the photosemiconductor device 4 via bonding wires 8 and have the other ends thereof connected to wiring conductors of an external electric circuit board through solder.

The external lead terminals 6 are made of a metal material such as an iron-nickel-cobalt or iron-nickel alloy. To fix the external lead terminals 6 to the substrate 1, holes of a diameter slightly larger than that of the external lead terminals 6 are formed in the substrate 1, the ring-shaped glass-made insulators 7 and the external lead terminals 6 are inserted into the holes, and then, the glass-made insulators 7 are melted by heating.

By coating the surfaces of the external lead terminals 6 with a metal layer excellent in corrosion resistance, connectability with the bonding wires 8 and wettability with solder such as a nickel plating layer or a gold plating layer having a thickness of 1 to 20 μm, the external lead terminals 6 are effectively prevented from being subjected to oxidative corrosion, and connection between the external lead terminals 6 and the bonding wires 8 and between the external lead terminals 6 and an external electric circuit can be carried out easily and firmly. Therefore, it is desirable to coat the surfaces of the external lead terminals 6 with a metal layer excellent in corrosion resistance, connectability with the bonding wires 8 and the wettability with solder such as a nickel plating layer or a gold plating layer having a thickness of 1 to 20 μm.

Onto the top surface of the substrate 1, the frame 2 is bonded so as to surround the mounting portion 1a on which the photosemiconductor device 4 is mounted, and a space for housing the photosemiconductor device 4 is formed inside the frame 2.

The frame 2 is made of a metal material such as an iron-nickel-cobalt or iron-nickel alloy, and is shaped into a predetermined configuration by performing a metalworking process such as rolling or press working on an ingot of, for example, an iron-nickel-cobalt alloy. To attach the frame 2 to the substrate 1, the top surface of the substrate 1 and the bottom surface of the frame 2 are brazed with a brazing filler metal such as silver solder.

The frame 2 has a through hole 2a in a side portion thereof. In the through hole 2a, a cylindrical metallic fixing member 9 is fixed.

In the metallic fixing member 9, an optical fiber 10 is inserted from the end outside the frame 2 and fixed so as to oppose the photosemiconductor device 4, whereby the optical fiber 10 can receive the optical signals from the photosemiconductor device 4. To fix the optical fiber 10 to the metallic fixing member 9, for example, a metal flange 10a previously attached to the optical fiber 10 is laser-welded to the outer end of the metallic fixing member 9.

The metallic fixing member 9 is made of a metal material such as an iron-nickel-cobalt or iron-nickel alloy. To fix the metallic fixing member 9 to the frame 2, the metallic fixing member 9 is inserted into the through hole 2a provided in the side portion of the frame 2 and a part of the circumferential surface thereof is brazed to the frame 2 with a brazing filler metal such as silver solder.

By coating the surface of the metallic fixing member 9 with a layer of a metal excellent in corrosion resistance such as nickel or gold having a thickness of 1 to 20 μm by plating, oxidative corrosion of the metallic fixing member 9 can be effectively prevented. Therefore, it is desirable to coat the surface of the metallic fixing member 9 with a layer of a metal excellent in corrosion resistance such as nickel or gold having a thickness of 1 to 20 μm.

Figure 2:
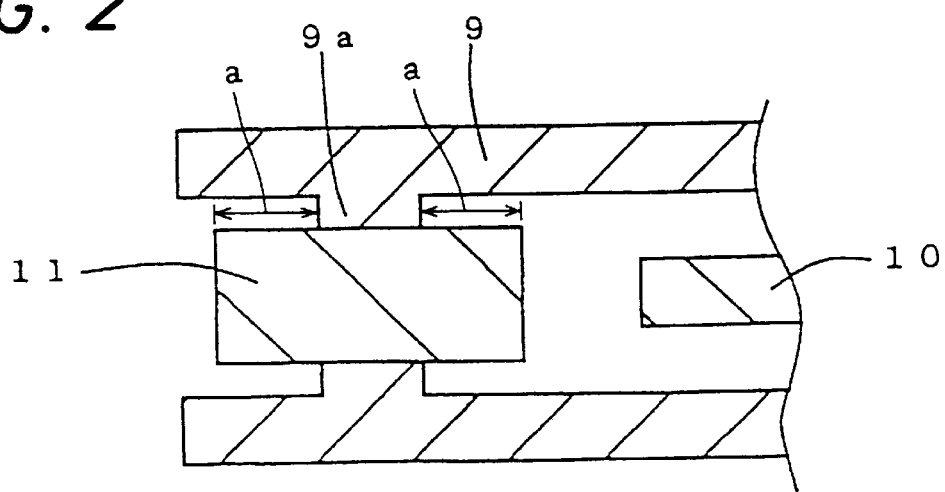
FIG. 2 is an enlarged cross-sectional view of an essential part of the package for housing a photosemiconductor device of FIG. 1.

FIG. 2 is an enlarged cross-sectional view of an essential part showing the relationship between the metallic fixing member 9 and a cylindrical lens 11. The metallic fixing member 9 has around the inner surface at the end inside the frame 2 a ring-shaped protrusion 9a protruding by a predetermined amount toward the central axis and having a width shorter than the length of the cylindrical lens 11. Only the central region of the circumferential surface of the cylindrical lens 11 is fixed to the inner surface of the ring-shaped protrusion 9a with a brazing filler metal.

Since the metallic fixing member 9 has the ring-shaped protrusion 9a having a width shorter than the length of the cylindrical lens 11 on the inner surface thereof, by brazing only the central region of the circumferential surface of the cylindrical lens 11 so that the ends of the cylindrical lens 11 extend from the ring-shaped protrusion 9a when the cylindrical lens 11 is fixed in the metallic fixing member 9 with a brazing filler metal as described later, it is facilitated to fix the cylindrical lens 11 without brazing outer regions of the circumferential surface of the cylindrical lens 11 near the ends thereof.

The cylindrical lens 11 fixed in the metallic fixing member 9 is made of glass having the refractive index decreased from the central axis to the circumferencial portion so as to have a lens function. The cylindrical lens 11 closes the inside hole of the metallic fixing member 9 to maintain the sealing hermeticity of the package, and transmits and condenses the light excited by the photosemiconductor device 4 housed in the package so that the optical fiber 10 receives the excited light.

The cylindrical lens 11 is fixed in the metallic fixing member 9 so that the ends thereof extend from the ring-shaped protrusion 9a, and only the central region of the circumferential surface other than the vicinities of the ends is brazed to the inner surface of the ring-shaped protrusion 9a of the metallic fixing member 9 with a brazing filler metal such as a gold-tin alloy.

Since outer regions of the circumferential surface of the cylindrical lens 11 near the ends thereof is not brazed, it never occurs that brazing stress is directly applied to the edges between the end surface and the circumferential surface of the cylindrical lens 11 when the cylindrical lens 11 is brazed to the metallic fixing member 9. Consequently, it never occurs that great stress concentrates on the edges and stays therein. As a result, even if the stress due to the heat generated during operation of the photosemiconductor device 4 is repetitively applied, it never occurs that this stress causes cracks in the cylindrical lens 11 in synergy with the stress staying in the edges.

To braze the cylindrical lens 11 to the metallic fixing member 9, metal thin films of Ti.Pt.Au are successively formed on the circumferential surface of the cylindrical lens 11 by a known thin film forming method such as vapor deposition or sputtering, and the metal thin films and the inner surface of the ring-shaped protrusion 9a of the metallic fixing member 9 are brazed with a brazing filler metal such as a gold-tin alloy.

The amount a by which the ends of the cylindrical lens 11 extend from the ring-shaped protrusion 9a of the metallic fixing member 9 is not less than 0.3 mm. With this protruding amount, when the cylindrical lens 11 is brazed to the metallic fixing member 9, the puddle of the brazing filler metal never reaches the edges between the end surface and the circumferential surface of the cylindrical lens 11, so that the cylindrical lens 11 resists cracking even if the thermal stress due to the heat generated during operation of the photosemiconductor device 4 is applied to the edges.

It is not always necessary to provide the ring-shaped protrusion 9a in order to fix the cylindrical lens 11 in the metallic fixing member 9 by fixing only the central region of the circumferential surface of the cylindrical lens 11 to the inner surface of the metallic fixing member 9 with a brazing filler metal, but the cylindrical lens 11 may be fixed by fixing only the central region of the circumferential surface to an inner surface having no ring-shaped protrusion like that of the conventional metallic fixing member with a brazing filler metal. In this case, for example, the metal thin film is formed only on the central region of the circumferential surface of the cylindrical lens 11, the cylindrical lens 11 with the metal thin film formed thereon is inserted into the metallic fixing member 9 having a brazing filler metal such as a gold-tin alloy applied onto its inner surface, and the circumferential surface of the cylindrical lens 11 and the inner surface of the metallic fixing member 9 that abut each other are brazed.

Onto the top surface of the frame 2, the lid 3 made of a metal material such as an iron-nickel-cobalt or iron-nickel alloy is bonded, so that the photosemiconductor device 4 is hermetically sealed in the package comprising the substrate 1, the frame 2 and the lid 3.

The bonding of the lid 3 onto the top surface of the frame 2 is performed by a welding method such as seam welding.

Thus, according to the package for housing a photosemiconductor device of the invention, the photosemiconductor device 4 is mounted on the mounting portion 1a of the substrate 1 with the Peltier device 5 in between, the electrodes of the photosemiconductor device 4 are electrically connected to the external lead terminals 6 via the bonding wires 8, the lid 3 is bonded onto the top surface of the frame 2, the photosemiconductor device 4 is placed in the package comprising the substrate 1, the frame 2 and the lid 3, and the optical fiber 10 is fixed in the metallic fixing member 9 fixed in the frame 2, so that a photosemiconductor apparatus as a final product is obtained. The photosemiconductor apparatus is used for high-speed optical communications in the following manner: the photosemiconductor device 4 excites light in response to a drive signal supplied from an external electric circuit, and the excited light is condensed through the cylindrical lens 11, received by the optical fiber 10 and is transmitted through the optical fiber 10.

Figure 3:
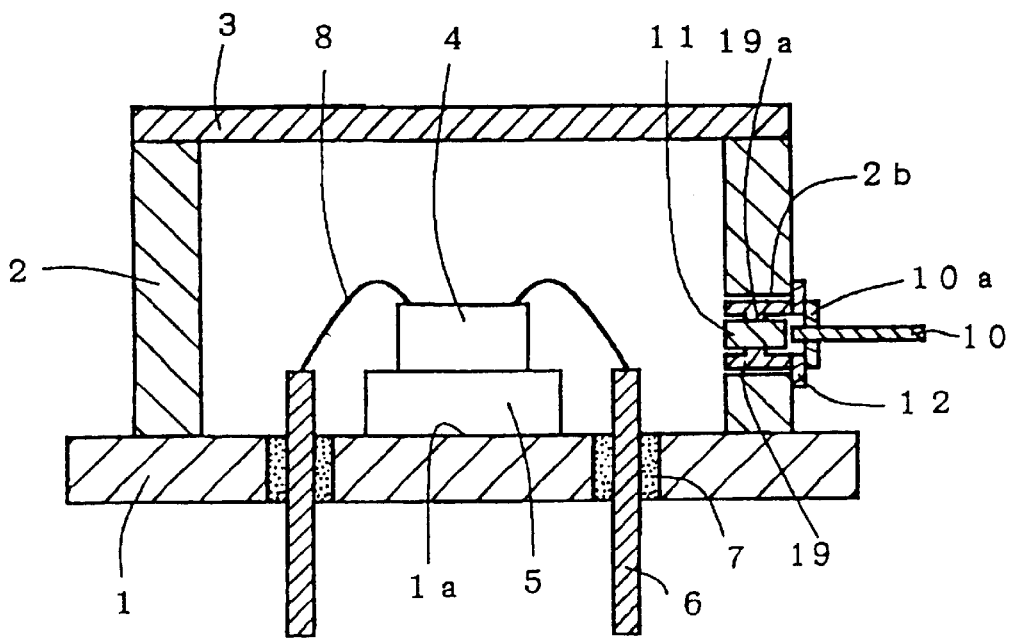
FIG. 3 is a cross-sectional view of another embodiment of a package for housing a photosemiconductor device according to the invention.

FIG. 3 is a cross-sectional view of another embodiment of a package for housing a photosemiconductor device according to the invention. The structure of this embodiment is similar to that of the previously-described embodiment, and like members are designated by like reference numerals and will not be described again.

The frame 2 of this embodiment also has a through hole 2b in which a cylindrical metallic fixing member 19 made of the same metal material as the metallic fixing member 9 of the previously-described embodiment is fixed.

The first difference of this embodiment from the previously-described embodiment is that the cylindrical lens 11 is fixed in a position where the metallic fixing member 19 coincides with the inner portion of the frame 2. With this structure, it is unnecessary for the inner end of the metallic fixing member 19 to largely protrude inside the frame 2, so that size reduction of the package for housing a photosemiconductor device can be achieved by reducing the size of the substrate 1 and the frame 2.

Figure 4:
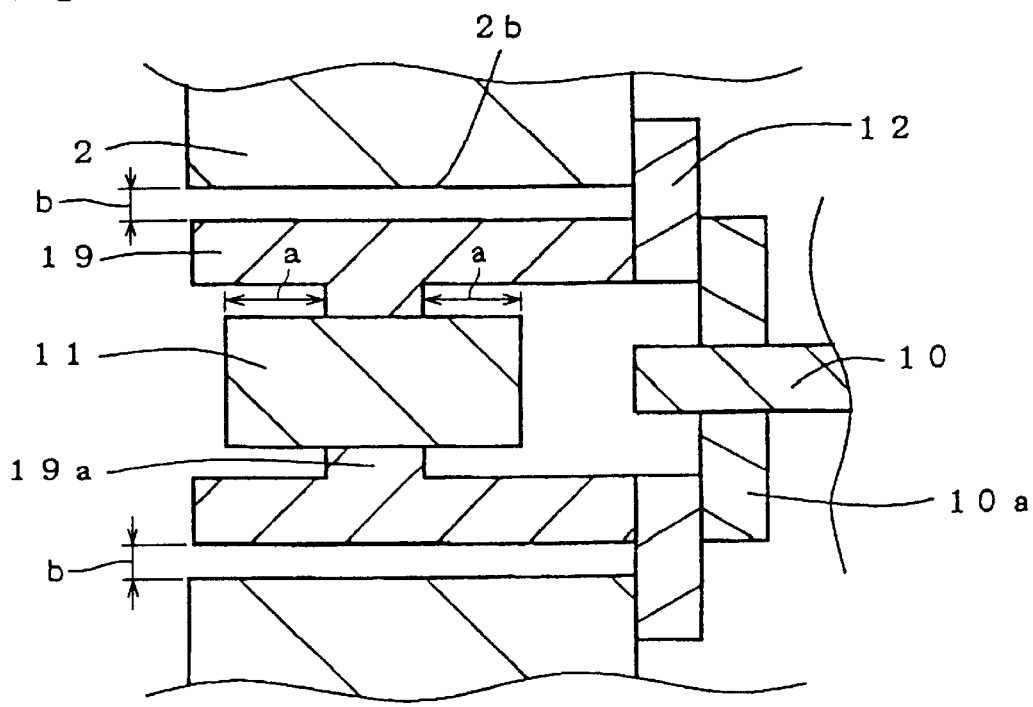
FIG. 4 is an enlarged cross-sectional view of an essential part of the package for housing a photosemiconductor device of FIG. 3.
Figure 5:
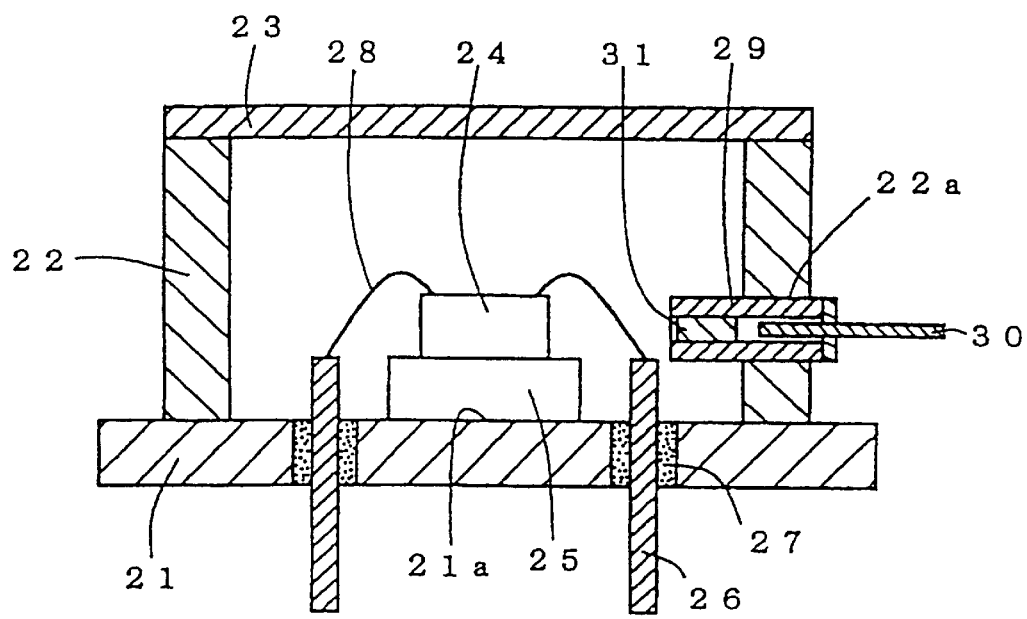
FIG. 5 is a cross-sectional view of the conventional package for housing a photosemiconductor device.

FIG. 4 is an enlarged cross-sectional view of an essential part showing the relationship between the metallic fixing member 19 and the through hole 2b provided in the frame 2. The second difference of this embodiment from the previously-described embodiment is that, as is apparent from FIG. 4, the outer diameter of the metallic fixing member 19 is smaller by approximately 0.1 to 1 mm than the inner diameter of the through hole 2b provided in the frame 2. With this structure, a gap b of 0.05 to 0.5 mm is formed between the inner surface of the through hole 2b and the metallic fixing member 19, and the metallic fixing member 19 is hermetically fixed in the frame 2 through a ring-shaped metal fitting 12 made of a metal such as an iron-nickel-cobalt alloy.

Since the metallic fixing member 19 is fixed to keep a gap of approximately 0.05 to 0.5 mm from the inner surface of the through hole 2b of the frame 2, even if the frame 2 thermally expands or contracts due to the heat generated during operation of the photosemiconductor device 4, it never occurs that the stress caused by the thermal expansion or the thermal contraction is applied to the portion of the metallic fixing member 19 where the cylindrical lens 11 is fixed. Consequently, it never occurs that this stress causes cracks in the cylindrical lens 11 in synergy with the stress caused to stay in the cylindrical lens 11 when the cylindrical lens 11 is brazed to the metallic fixing member 19.

When the gap between the metallic fixing member 19 and the inner surface of the through hole 2b of the frame 2 is less than 0.05 mm, the possibility tends to be strong that when the metallic fixing member 19 is brazed to the frame 2, a part of the brazing filler metal enters the gap between the peripheral surface of the metallic fixing member 19 and the inner surface of the through hole 2b of the frame 2 because of a capillary phenomenon to fill the gap. Therefore, it is desirable that the gap between the metallic fixing member 19 and the inner surface of the through hole 2b of the frame 2 should not be less than 0.05 mm.

To fix the metallic fixing member 19 to the frame 2, the metallic fixing member 19 is inserted into the through hole 2b of the frame 2, and the outer end of the metallic fixing member 19 and the metal fitting 12, and the metal fitting 12 and the outer surface of the frame 2 are brazed with a brazing filler metal such as silver solder so that there is a gap of approximately 0.05 to 0.5 mm from the inner surface of the through hole 2b.

It is not always necessary to interpose the metal fitting 12 when the metallic fixing member 19 is brazed to the frame 2. In this case, a flange extending outward from the central axis of the metallic fixing member 19 may be integrally formed at the outer end of the metallic fixing member 19. The flange is brazed to the outer surface of the frame 2 with a brazing filler metal such as silver solder.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

For example, while the external lead terminals 6 are fixed to the substrate 1 in the embodiments, the external lead terminals 6 may be fixed to the frame 2.

What is claimed is:

1. A package for housing a photosemiconductor device, comprising:

a substrate having a top surface and a mounting portion on which a photosemiconductor device is mounted;

a frame attached to the top surface of the substrate and surrounding the mounting portion, the frame having a top surface, an inside end, an outside end, a side portion and a through hole in the side portion;

a cylindrical metallic fixing member fixed in the through hole, in which an optical fiber is fixed at the outside end of the frame and a cylindrical lens having a circumferential surface is fixed at the inside end of the frame, the cylindrical metallic fixing member defining an inner surface; and a lid attached to the top surface of the frame, the lid hermetically sealing the photosemiconductor device, wherein the cylindrical lens is fixed to a portion of the inner surface of the metallic fixing member with a brazing filler metal in only a central region of the circumferential surface of the cylindrical lens.

2. The package for housing a photosemiconductor device of claim 1, wherein the metallic fixing member has an inner circumferential surface and a ring-shaped protrusion on the inner circumferential surface of the metallic fixing member, the ring-shaped protrusion having an inner circumferential surface and a width shorter than the length of the cylindrical lens, and the cylindrical lens is fixed to the inner circumferential surface of the ring-shaped protrusion.

3. The package for housing a photosemiconductor device of claim 2, wherein ends of the cylindrical lens fixed to the ring-shaped protrusion extend from the ring-shaped protrusion by 0.3 mm or more.

4. The package for housing a photosemiconductor device of claim 1, wherein the through hole of the frame has an inner surface, and the metallic fixing member is fixed to the frame with a gap provided between the metallic fixing member and the inner surface of the through hole of the frame.

5. The package for housing a photosemiconductor device of claim 4, wherein the gap between the metallic fixing member and the inner surface of the through hole in which the metallic fixing member is inserted is 0.05 to 0.5 mm.

6. The package for housing a photosemiconductor device of claim 4 or 5, wherein the metallic fixing member has an inner circumferential surface and a ring-shaped protrusion on the inner circumferential surface of the metallic fixing member, the ring-shaped protrusion having an inner circumferential surface and a width shorter than the length of the cylindrical lens, and the cylindrical lens is fixed to the inner circumferential surface of the ring-shaped protrusion.

7. The package for housing a photosemiconducotor device of claim 6, wherein ends of the cylindrical lens fixed to the ring-shaped protrusion extend from the ring-shaped protrusion by 0.3 mm or more.

* * * * *